March 4, 1930.  G. M. SORENSEN  1,749,614
TONGS FOR SUGAR, CANDY, ETC

Filed April 12, 1928

Gunhilde M. Sorensen
*INVENTOR.*

BY

Charles A. Clark
*ATTORNEY.*

Patented Mar. 4, 1930

1,749,614

UNITED STATES PATENT OFFICE

GUNHILDE M. SORENSEN, OF WEEHAWKEN, NEW JERSEY

TONGS FOR SUGAR, CANDY, ETC.

Application filed April 12, 1928. Serial No. 269,527.

My invention relates to devices for holding small articles and refers more particularly to tongs for sugar, candy, etc.

One object of my invention is to provide an artistic, cheap and effective device for handling sugar, candy, etc.

Another object of my invention is to provide a sugar and candy tongs having jaws that are held in locking position by a spring within a hollow handle.

With these and other objects in view, my invention consists of the novel arrangement of unique parts and the particular organization of peculiar elements illustrated in the accompanying drawings, wherein similar parts are referred to by like numerals, in which:—

Figure 1:
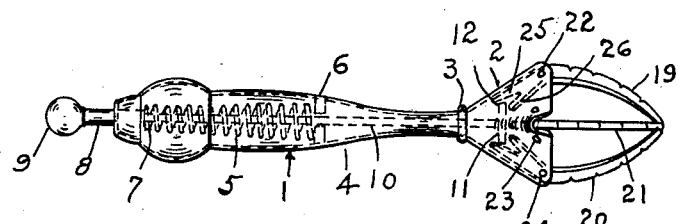
Figure 1, is an elevation of the device with the jaws closed.

The tongs 1, consist of a triangular shaped end 2, tapering at 3, into a tubular handle 4, containing a spring 5, one end of which presses against the partition 6, and the other end presses against the shoulder 7, of the rod 8.

The rod 8, terminates on one end with a ball 9, and continues beyond the shoulder 7, with a stem 10, which carries a disc 11, beveled at 12, toward the said shoulder 7.

Each of the three corners 13, 14 and 15, of the triangular shaped part 2, provides spaces 16, 17 and 18, adapted to hold the claws 19, 20 and 21, pivoted at 22, 23 and 24.

The claws, outside of the triangular receptacle are formed to imitate chicken claws and each of the ends within the receptacle are bifurcated, the disc 11, operating between the long part 25 and the short part 26, so that when the claws are closed, as clearly shown in Figure 1, the jaws will be locked and cannot be moved without moving the rod 8.

Figure 2:
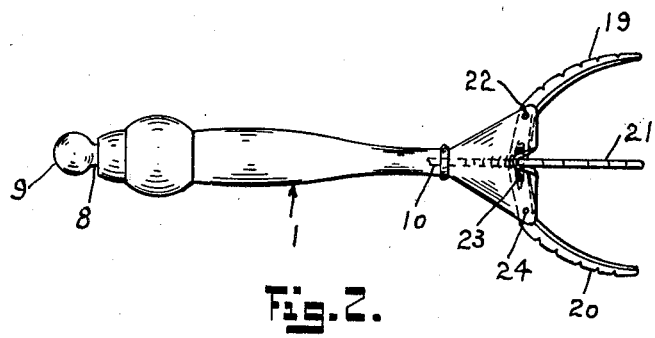
Figure 2, is an elevation of the device with the jaws open.
Figure 3:
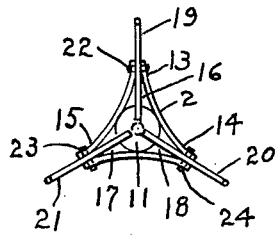
Figure 3, is a plan of the device looking down upon the jaws.

In operation, when the knob or ball 9, is pressed in, the jaws will open, as clearly shown in Figure 2, and the jaws may be placed over the article to be lifted and when the knob is released the jaws will close under pressure of the spring 5, and in the position shown in Figure 1, the disc 11, will lock the jaws together.

Having thus described and illustrated the preferred embodiment of my invention, I do not wish to limit myself to the exact construction or arrangement of parts shown, since it is evident that modifications may be made therein without departing from the spirit of the invention or scope of the claim.

I claim:—

A gripping device for small articles comprising a hollow body provided with an enlargement at one end and a triangular shaped hollow head at the other end, claws pivoted in the head, a push pin provided with a disc to operate the claws, and a spring surrounding the pin and within the body to hold the claws closed.

Signed at New York in the county and State of New York this 9th day of April, 1928.

GUNHILDE M. SORENSEN.